March 22, 1966 O. C. NIEDERER, JR., ETAL 3,241,433
EGG CANDLING DEVICE WITH MEANS TO LIMIT THE NUMBER
OF EGGS VIEWABLE AT THE CANDLING STATION
Filed June 12, 1962 3 Sheets-Sheet 1

INVENTORS
OTTO C. NIEDERER JR.
BY HERBERT O. NIEDERER
Albert Sperry
ATTORNEY

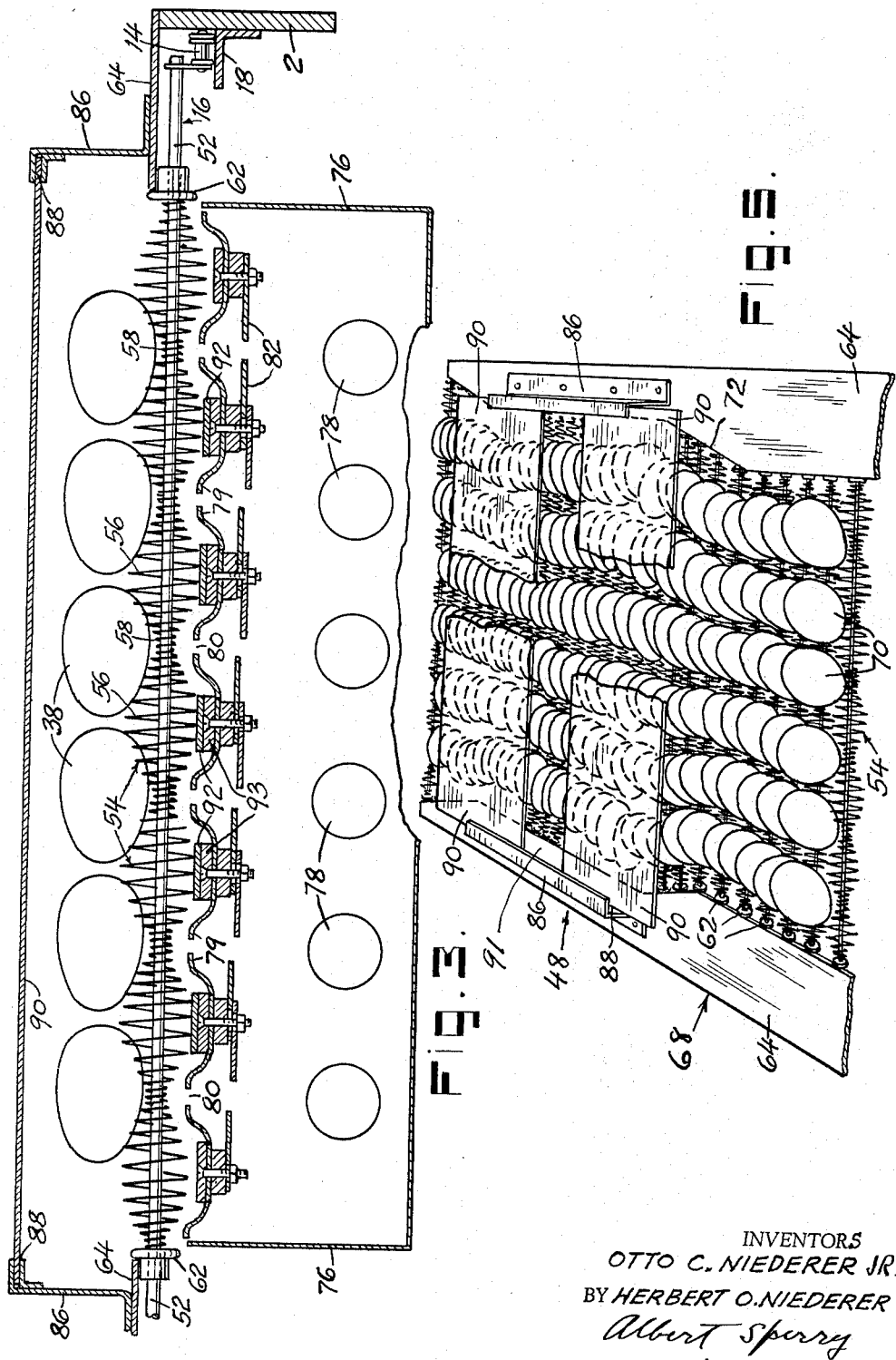

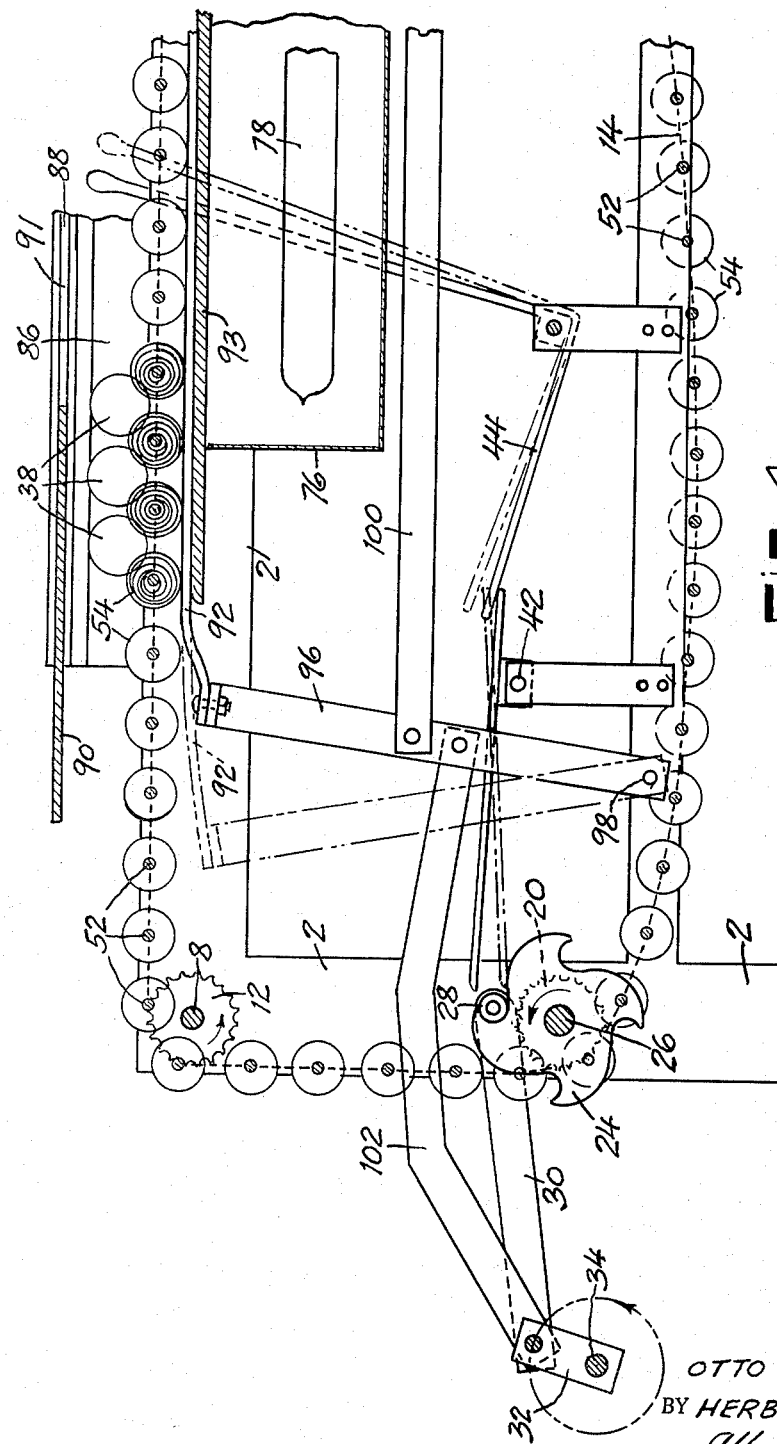

United States Patent Office 3,241,433
Patented Mar. 22, 1966

3,241,433
EGG CANDLING DEVICE WITH MEANS TO LIMIT
THE NUMBER OF EGGS VIEWABLE AT THE
CANDLING STATION
Otto C. Niederer, Jr., Bear Tavern Road, and Herbert O. Niederer, Church Road, both of Titusville, N.J.
Filed June 12, 1962, Ser. No. 201,890
5 Claims. (Cl. 88—14.5)

This invention relates to egg candling equipment and is directed particularly to construction adapted to handle a large number of eggs at a time while insuring high quality candling and inspection of the eggs.

The candling of eggs for the purpose of determining their quality, the presence of blood spots, cracks or other imperfections is almost universal today and is accomplished by passing the eggs over a slot or opening through which light is projected through the eggs. In modern egg handling plants, the eggs to be candled must be inspected very rapidly and, for this purpose, they are frequently transferred directly from an egg crate to a conveyor by lifting means which deposit a whole layer of eggs on the conveyor at one time. The eggs then are presented to the candler in a plurality of rows extending longitudinally of the conveyor and the multiple rows of eggs are illuminated over a relatively large area or length of travel in order to allow sufficient time for adequate inspection of each of the eggs by the candler. However, the operator then cannot concentrate his attention on a small area or limited number of eggs at a time. As a result, it is found in practice that the illumination and inspection of a large number of eggs place a severe strain on the candler's eyes, and the operation cannot be continued for a long period of time. Moreover, even when the operator is rested and alert, the number of imperfect eggs which escape detection under such high speed candling conditions is found to be substantially increased.

In accordance with the present invention, these objections and limitations inherent in constructions of the prior art are reduced or eliminated and egg candling means are provided which permit high speed candling of eggs without impairing the quality of the candling operation.

These advantages are preferably attained by limiting the number and area of the eggs illuminated during the candling operation. The eggs further may be moved or rotated in such a way as to cause the yolk and albumen of the egg to rotate within the illuminated egg shell whereby the presence of any imperfections such as blood spots and the like is made very apparent.

Accordingly, the principal object of the invention is to permit the rapid candling of a large number of eggs without any reduction in the quality of the operation.

A further object of the invention is to reduce the fatigue and eye strain to which operators are subjected in the high speed candling of eggs.

Another object of the invention is to limit the number of eggs which are exposed at one time in a candling operation without reducing the speed of the operation.

An additional object of the present invention is to move the eggs being candled in a novel manner so as to facilitate the inspection thereof.

These and other objects and features of the present invention will appear from the following description thereof in which reference is made to the figures of the accompanying drawings.

In the drawings:

FIG. 3 is a transverse sectional view of the construction shown in FIG. 2 taken on the line 3—3 thereof;

FIG. 4 is an enlarged view of a portion of the construction shown in FIG. 2; and FIG. 5 is a perspective illustrating a portion of the equipment shown in FIG. 1.

Figure 1:
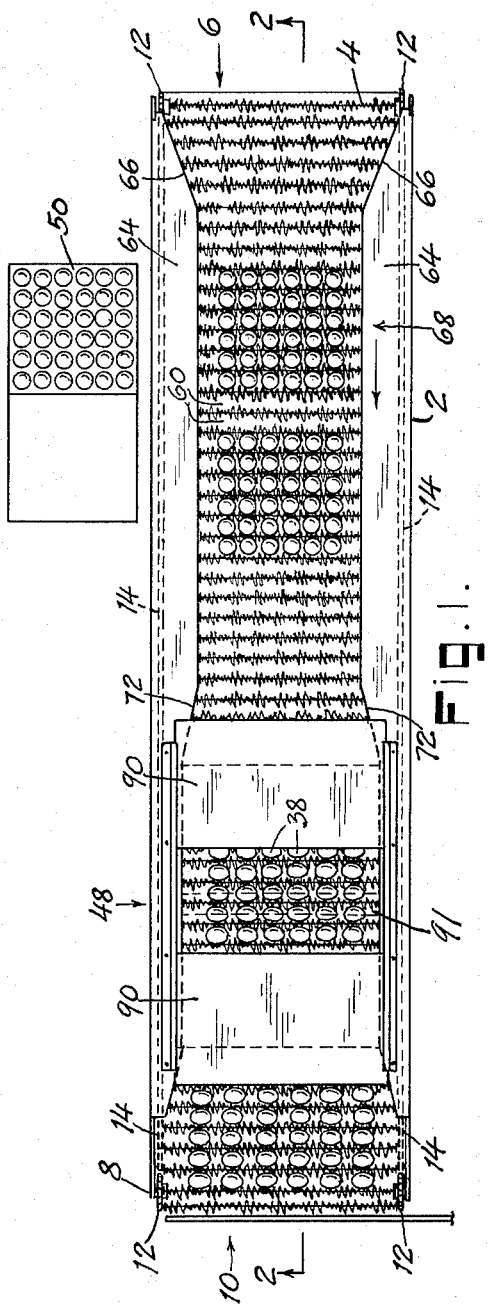
FIG. 1 is a plan view of a typical form of candling equipment embodying the present inventioin.

In that form of the invention chosen for purposes of illustration in the drawings, the candling equipment is mounted on a frame 2 having a shaft 4 rotatably supported thereon near the loading end 6 of the equipment and a shaft 8 rotatably supported on the frame 2 near the discharge end 10 of the equipment. Each of the shafts 4 and 8 is provided with two sprockets 12 located near the sides of the frame 2 and conveyor chains 14 pass about the sprockets and present an upper run 16 movable in a direction from the loading end 6 to the discharge end 10 of the equipment. The chains 14 are supported on flanged members 18 secured to the frame 2 on the opposite inner surfaces thereof so as to maintain the upper run 16 of the conveyor horizontal during the longitudinal movement thereof.

The conveyor chains 14 are driven by a sprocket 20 which is actuated by a motor 22. As shown, the sprocket 20 preferably is rotated step by step by means of a ratchet wheel 24 secured to the drive shaft 26 on which the sprocket 20 is fixedly mounted. A pawl 28 engages the ratchet wheel 24 and is carried by an arm 30 movable by the crank 32 rotatable with a drive shaft 34 by the motor 22. The crank 32 is movable in a clockwise direction as seen in FIG. 2 so that the pawl 28 engages the teeth of the ratchet 24 to rotate the sprocket 20 and advance the upper run 16 of the conveyor 36 step by step to the left in FIG. 2 from the loading end 6 of the equipment to the discharge end 10 thereof.

Figure 2:
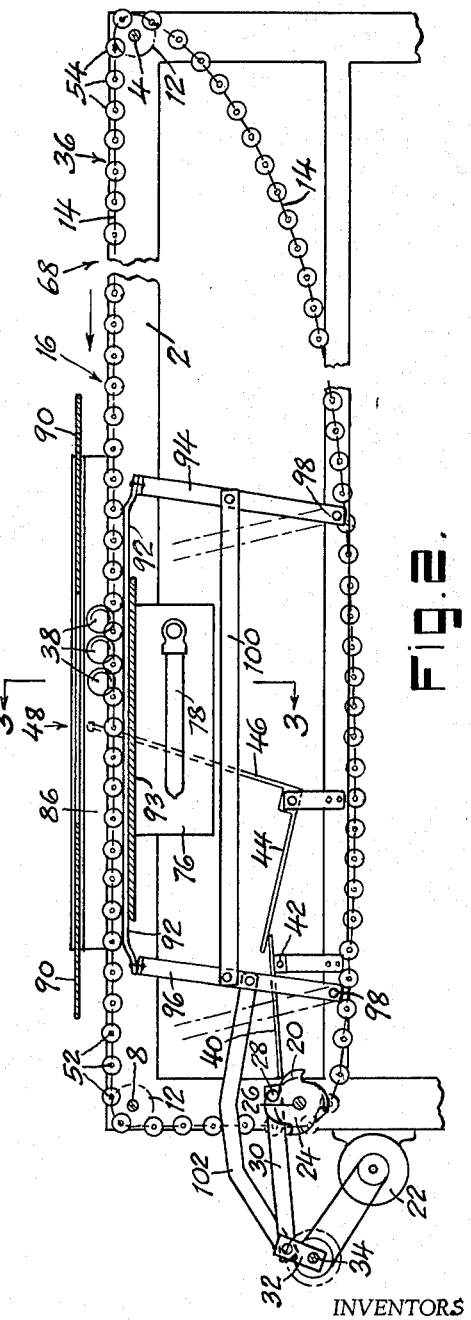
FIG. 2 is a longitudinal sectional view of the construction shown in FIG. 1 taken on the line 2—2 thereof.

Further, in the construction as shown in FIG. 2, the arm 30 and pawl 28 of the driving mechanism for the conveyor 36 may be raised to disengage the pawl 28 from the ratchet wheel 24. In this way, the advancing movement of the conveyor may be interrupted when desired to hold the eggs 38 on the upper run 16 of the conveyor 36 in a stationary position for more careful inspection or to allow time to remove one or a number of eggs from the conveyor when necessary. For this purpose, a lifting arm 40 is pivotally mounted at 42 and engageable by an arm 44 actuated by lever 46. The lever 46 is located adjacent the candling station 48 so that the operator can start and stop the advancing movement of the conveyor at any time and in order to permit effective and careful inspection of the eggs being candled.

The conveyor 36 preferably is of the general type shown and described in our co-pending application for patent Serial No. 170,768, now Patent No. 3,148,761. However, the conveyor may be of any suitable or preferred type embodying a plurality of transversely extending rods 52 upon which egg supporting members 54 are mounted. The egg supporting members 54 are preferably formed of coiled spring material surrounding the rods 52 and formed with enlarged portions 56 and portions 58 of reduced diameter wihch are arranged to cooperate in forming a plurality of egg receiving cavities or openings through the conveyor as shown at 60 in FIG. 1. As shown most clearly in FIGS. 1 and 4, the use of coiled spring material or the like in forming the egg supporting members 54 permits the passage of a maximum amount of light upward through the egg supporting means to the egg supported thereby whereby the eggs are illuminated completely for candling purposes.

As shown most clearly in FIGS. 3 and 5, the coiled spring egg supporting members 54 are provided at their opposite ends with flanged rollers 62 engageable with guide means 64 which project inwardly from the outer sides of the frame 2 of the equipment. Therefore, as shown in FIG. 1, the egg supporting members 54, after they pass about the sprockets 12 at the loading end 6 of the frame 2, engage the inwardly inclined portions 66 of the guide members 64 and are compressed so that the length thereof is reduced. The cavities 60 between the reduced portions 58 of the egg supporting members 54 are then moved closer together as shown at the loading station 68 in FIGS. 1 and 5. When thus arranged, the positions of the egg receiving cavities 60 correspond to the spacing and arrangement of the eggs in a conventional egg crate 50. Accordingly, it is possible to employ conventional egg lifting means, which may be vacuum operated or of any other suitable type adapted to lift all or a plurality of the eggs at a time from a single layer within the crate 50. The eggs then may be deposited in the cavities 60 of the upper run 16 of the conveyor with the eggs held in the same relative positions and arrangement as they were within the egg crate 50. Further, as shown most effectively in the perspective view of FIG. 5, the egg lifting device may be manipulated when depositing the eggs on the conveyor at the loading station 68 so as to incline all of the eggs slightly to one side as represented by the eggs 70.

Thereafter, as the eggs are advanced from the loading station 68 to the candling station 48, the flanged rollers 62 will pass beyond the inclined guide surfaces 72 of the guide means 64. As a result, the coiled spring egg supporting members 54 expand transversely of the conveyor in such a way as to cause all of the eggs to be shifted to positions in which their long axes extend horizontally and transverse to the direction of movement of the conveyor as shown in FIG. 5. The eggs are then suitably spaced and arranged to permit rapid and accurate candling thereof during their movement through the candling station. However, they are not spaced sufficiently to allow any great amount of light to be projected upwardly between the ends of the eggs. In practice, it is found that when the egg supporting means are expanded or otherwise arranged so that the egg receiving cavities 60 in the conveyor are on 2½ inch centers transversely of the conveyor 36, eggs of almost all sizes will assume horizontal positions in parallel rows extending transversely of the conveyor 36 and in end to end relation for most effective candling of the eggs. The ends of the eggs are substantially in contact or are spaced apart such a limited distance as to prevent any objectionable glare of light upward between the ends of the eggs or toward the eyes of an operator at the candling station.

As shown in FIGS. 2 and 3, a light box 76 is positioned beneath the upper run 16 of the conveyor at the candling station 48 and a plurality of lights 78 are located in the light box beneath the longitudinally extending rows of horizontally positioned eggs supported in the elongated egg receiving cavities 60 between the reduced portions 58 of the coiled spring egg supporting members 54. In the preferred construction illustrated, the upper portion of the light box 76 is provided with upwardly inclined light shielding elements 79 in the form of elongated strips spaced apart to form the light transmitting slots 80 extending lengthwise of the conveyor directly beneath the longitudinally extending rows of the eggs to be candled. If desired, additional adjustable light shielding elements 82, also in the form of elongated strips, may be positioned beneath the upwardly inclined light shielding elements 79 to cooperate therewith in limiting the direction in which the light is projected onto the eggs to a vertical or somewhat rearwardly inclined direction so as to prevent any possible direct transmission or glare of light into the eyes of an operator positioned adjacent the equipment at the candling station 48. In practice, the lights or illuminating means 78 preferably are elongated and extend parallel to the slots 80 and in the direction of movement of the longitudinally extending rows of eggs to be candled. In this way, each of the eggs supported on the upper run of the conveyor is effectively subjected to brilliant illumination so that the light penetrates the shell of each egg rendering it possible to observe the presence of any cracks, blood spots, enlarged air cells or the like within the egg.

Since the eggs when thus presented to the candler at the candling station are brightly illuminated and are arranged in a plurality of rows extending both lengthwise and transversely of the conveyor, the operator's eyes are subjected to a relatively large area of bright light. The area thus illuminated may contain from 30 to 50 eggs, and while each egg is effectively illuminated for candling purposes and no direct rays of light may reach the operator's eyes, the large number of eggs exposed to view at one time and the relatively rapid movement thereof is found to be confusing and objectionable to even the most experienced egg candlers. As a result, the operator's eyes soon become tired and frequent rest periods are required. Even then imperfect eggs are often passed unobserved so that the quality of the candling operation may be impaired.

In order to overcome this difficulty and yet assure rapid and high quality candling without subjecting the operator to eye strain, the frame of the present invention is preferably provided with elongated guide members 86 which are located at opposite sides of the frame 2 adjacent the candling station. The upper extremities of the guide members 86 are formed with inwardly facing channels 88 extending parallel to the upper run 16. Two horizontally spaced light shields 90 formed of opaque sheet material have the opposite ends thereof positioned in and freely slidable lengthwise in the channels 88 of the guide members 86. In this way, as shown in FIG. 1, the operator may move the light shields 90 relatively far apart and to the positions as shown in full lines in FIG. 1 whereby a relatively wide sight opening 91 is presented through which four, five or more transversely extending rows of eggs may be exposed to view at the same time. On the other hand, if and when he prefers, the operator may slide the light shields 90 longitudinally toward each other and to the dotted line position of FIG. 1 whereby the sight opening 91 is provided through which only one or two of the transversely extending rows of eggs will be exposed to view.

With this construction, the operator can readily control the width of the sight opening 91 and the number of eggs exposed to view for candling purposes at any particular time. He can, when desired, concentrate his attention upon a single row of eggs extending transversely on the upper run of the conveyor. In practice, the operators generally leave two or three transversely extending rows of eggs exposed to view through the sight opening 91 and the actuating means for advancing the conveyor 36 and the eggs 38 step by step lengthwise of the frame may be adjusted to bring one or a predetermined number of transverse rows of eggs into position for inspection by the candler upon each forward step of the conveyor. Between the successive forward steps or movements, the conveyor with the eggs thereon is held stationary for a short interval of time sufficient to permit careful inspection of all of the eggs which are exposed. The conveyor and the eggs are then advanced to a new position in which one or more different or additional transverse rows of eggs are presented for inspection. In this way, the operator can candle a large number of eggs carefully and rapidly while controlling the number of eggs exposed to view at any time so as to reduce or eliminate eye strain and confusion resulting from movement of the eggs during the egg candling process. The arrangement of the eggs in substantial end to end contact transversely of the conveyor while being illuminated by light projected through longitudinally extending slots 80 further serves to reduce glare and reflections of light from the ends of the eggs toward the eyes of the candler. Moreover, if and when necessary, the ratchet controlling lever 48 may be actuated to interrupt the advancing movement of the conveyor altogether to allow the eggs to be inspected even more carefully or to permit removal of one or more eggs from the conveyor.

In order further to aid in the candling of eggs, the present invention is preferably also provided with means for rotating the eggs as they approach the candling station and are brought into position to be inspected. The eggs may even be rotated first in one direction and then in the reverse whereby the yolk and white of the egg are caused to turn within the shell so that all sides of the yolk and white will be presented toward the candler and any blood spots or the like will be seen to rotate within the shell so that their presence is readily noted.

For this purpose, fabric or other webs or strips of material 92 may be moved longitudinally of the frame lengthwise of pressure plates 93 directly beneath and in contact with the enlarged portions 56 of the egg supporting members 54. As shown in FIGS. 2, 3 and 4, such egg rotating means may be in the form of flexible strips of webbing 92 having the opposite ends thereof secured to arms 94 and 96 which are pivotally secured at 98 near the lower portion of the frame of the equipment. The arms 94 and 96 are connected by a link 100 and are caused to oscillate together by means of the driving member 102 which is secured at one end of the arm 96 and has its opposite end secured to a crank member 32 rotatable with the crank shaft 34.

With this construction, the advancing movement of the upper run 16 of the conveyor and the reciprocating movement of the flexible strips of webbing 92 are coordinated. Thus, upon forward movement of the upper run of the conveyor to the left as seen in FIG. 2 to advance a row of eggs into position to be inspected by an operator, the strips of webbing 92 also are moved to the left, but at a more rapid speed than the upper run of the conveyor 16. Since the webbing 92 engages the enlarged portions 56 of the egg supporting means 54, the egg supporting means are rotated as the conveyor is advanced. The eggs 38 resting upon the egg supporting means 54 are thus rotated in a counter-clockwise direction as seen in FIGS. 2 and 4 as they are advanced to a candling position during forward movement of the conveyor. However, when the forward movement of the conveyor is halted and while the pawl 28 moves idly forward to engage another tooth of the ratchet wheel 24, the arms 94 and 96 with the strips 92 are moved to the right as seen in FIG. 4. The egg supporting means and the eggs 38 thereon are then rotated in the opposite or counterclockwise direction. Such rotation of the eggs serves to cause the yolks and the albumen of the eggs to rotate within the egg shells, and, as a result, any spots or imperfections in the yolk or albumen of the egg may be seen to move within the illuminated eggs. Moreover, because of the alternate counter rotation of each egg, any dark spot moving within the egg shell will move in a direction opposite to that of the shell itself and all checks, cracks, imperfections or dirt on the shell will be contrasted with those blood spots or defects in the contents of the shell. In this way, imperfections in either the egg shell or the yolk and albumen become immediately apparent and contrasted one with another so that even inexperienced operators can readily note the presence of any imperfect egg in the transverse row or rows of eggs illuminated and exposed in the sight opening between the opaque light shields 90 and can determine the character of such defect.

During each advancing movement of the upper run of the conveyor, the flexible strips 92 are moved to a position in which they serve to rotate additional eggs for the most effective candling of all of the eggs supported by the conveyor even though the conveyor and the eggs are advanced quite rapidly. In fact, high quality candling of eggs can be effected with the equipment illustrated and described at the rate of thirty cases per hour which is about as fast as eggs can be cleaned or graded so that the candling operation no longer is a bottleneck in the high speed handling of eggs.

Further, as shown in FIGS. 1 and 5, the eggs after they have passed the candling station 48 and as they approach the discharge end 10 of the equipment, may be spread further apart by additional expansion of coiled spring egg supporting means 54. When so spaced, the eggs may be passed directly to egg grading equipment or to egg breaking, egg packing or other egg treating or handling means. Typical equipment to which the eggs may be discharged from the egg candler is that shown and described in U.S. Patent No. 2,246,597.

While it is desirable and preferred to employ coiled spring type egg supporting means 54 in the practice of the present invention, other types of egg supporting means may be used such as the spools and either symmetrically or unsymmetrically shaped rollers formed of wood, rubber, plastic or other material which have frequently been used heretofore in egg handling equipment. Furthermore, equipment embodying the present invention can be effectively and advantageously used without employing the flexible reciprocating egg rotating strips 92 or other means for rotating the eggs as an incident to the candling thereof.

In view thereof, it will be apparent that equipment embodying the present invention is capable of many changes and modifications in the construction, arrangement and operation of the various elements thereof and in the combination and arrangement of the various elements of the equipment. In view thereof, it should be understood that the particular embodiment of the invention as shown in the drawings and described above is intended to be illustrative only and is not intended to limit the scope of the invention.

We claim:

1. Egg candling equipment comprising:
   (a) a frame;
   (b) a conveyor mounted on said frame for moving eggs past a candling station, said conveyor including egg-supporting members spaced apart to define openings in the conveyor in which eggs to be candled are supported by the members in rows extending transversely of the conveyor;
   (c) illuminating means positioned to projemt light upwardly through said opening throughout a predetermined area of the conveyor as it moves past the candling station;
   (d) drive means connected between the conveyor and at least those egg-supporting members passing the candling station, said drive means rotating the egg-supporting members first in one direction and then in the opposite direction so as to produce a corresponding rotation of the eggs supported thereby first in one direction and then in the opposite direction; and
   (e) at least two opaque light shields mounted upon the frame above the conveyor and presenting adjacent edges extending transversely of the conveyor in said area to define a sight opening past which all the eggs are movable, one at least of said shields being freely slidable upon the frame longitudinally of the conveyor toward and away from the other shield to vary the width of the sight opening and the number of rows of eggs in said predetermined area of the conveyor that are visible at one time by an operator stationed at said candling station.

2. Egg candling equipment comprising:
   (a) a frame;
   (b) a conveyor mounted on said frame for moving eggs past a candling station, said conveyor including egg-supporting members spaced apart to define opening in the conveyor in which eggs to be candled are supported by said members in rows extending transversely of the conveyor;
   (c) illuminating means positioned to project light upwardly through said openings throughout a predetermined area of the conveyor as it moves past the candling station;
(d) first and second light shielding elements superposed one upon the other in vertically spaced relation between the illuminating means and the conveyor to form a substantially vertical, columnar projection of light passing through said openings to the rows of eggs supported thereover; and
(e) at least two opaque light shields mounted upon the frame above the conveyor and presenting adjacent edges extending transversely of the conveyor in said area to define a sight opening past which all the eggs are movable, one at least of said shields being freely slidable upon the frame longtindinally of the conveyor toward and away from the other shield to vary the width of the sight opening and the number of rows of eggs in said predetermined area of the conveyor that are visible at one time by an operator stationed at said candling station.

3. Egg candling equipment as in claim 2 wherein said first and second light shielding elements are in the form of transversely spaced, parallel pairs of strips, each of said pairs including a first and a second light shielding element and extending longitudinally of the conveyor, through at least said predetermined area thereof in perpendicularly intersecting relation to said rows visible through said sight opening.

4. Egg candling equipment comprising:
(a) a frame;
(b) a conveyor mounted on said frame for moving eggs past a candling station, said conveyor including egg-supporting members spaced apart to define openings in the conveyor in which eggs to be candled are supported by said members in rows extending transversely of the conveyor;
(c) illuminating means positioned to project light upwardly through said openings throughout a predetermined area of the conveyor as it moves past the candling station;
(d) drive means connected between the conveyor and at least those egg-supporting members passing the candling station, said drive means rotating the egg-supporting members first in one direction and then in the opposite direction so as to produce a corresponding rotation of the eggs supported thereby first in one direction and then in the opposite direction;
(e) first and second light shielding elements superposed one upon the other in vertically spaced relation between the illuminating means and the conveyor to form a substantially vertical, columnar projection of light passing through said openings to the rows of eggs supported thereover; and
(f) at least two opaque light shields mounted upon the frame above the conveyor and presenting adjacent edges extending transversely of the conveyor in said area to define a sight opening past which all the eggs are movable, one at least of said shields being freely slidable upon the frame longitudinally of the conveyor toward and away from the other shield to vary the width of the sight opening and the number of rows of eggs in said predetermined area of the conveyor that are visible at one time by an operator stationed at said candling station.

5. Egg candling equipment as in claim 4 wherein said first and second light shielding elements are in the form of transversely spaced, parallel pairs of strips, each of said pairs including a first and a second light shielding element and extending longitudinally of the conveyor, through at least said predetermined area thereof in perpendicularly intersecting relation to the rows visible through said sight opening, said driving connection including at least one belt mounted above a pair of the light-shielding elements in driving engagement with the egg-supporting members, said belt extending longitudinally and centrally of said pair of shielding elements, inwardly from the side edges of said elements.

References Cited by the Examiner

UNITED STATES PATENTS

| 1,075,640 | 10/1913 | Foster | 88—14.8 |
| 1,394,445 | 10/1921 | Rogers. | |
| 1,493,538 | 5/1924 | Henry | 88—14.5 |
| 1,864,034 | 6/1932 | Wyland | 88—14.8 |
| 2,492,031 | 12/1949 | Blatz | 250—105 |
| 2,497,655 | 2/1950 | Bramson | 88—14.5 |
| 2,536,250 | 1/1951 | Archer. | |
| 2,979,746 | 4/1961 | Willsey | 88—14.5 |
| 3,060,794 | 10/1962 | Reading | 88—14.8 |
| 3,148,761 | 9/1964 | Niederer et al. | 88—14.8 |

JEWEL H. PEDERSEN, *Primary Examiner.*